United States Patent Office 3,527,630
Patented Sept. 8, 1970

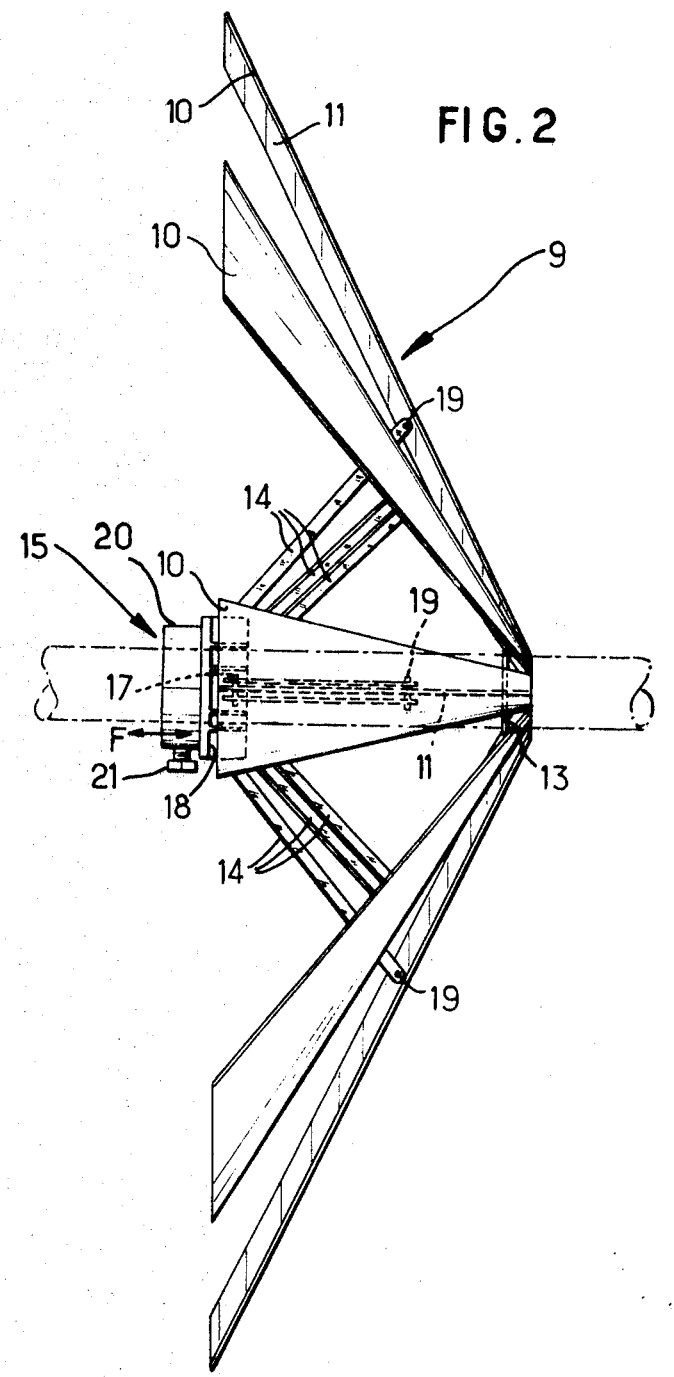

3,527,630
METHOD FOR MAKING PACKAGE-OPENING TEAR-OFF STRIPS OF SMALL WIDTH FROM A BAND OF LARGE WIDTH
Albert Altfeld, Beauvais, France, assignor to Novacel Societe Anonyme, Paris, France, a corporation of France
Filed May 29, 1967, Ser. No. 642,113
Int. Cl. B65h 81/00
U.S. Cl. 156—191     6 Claims

ABSTRACT OF THE DISCLOSURE

A method for the production of package-opening tear-off strips of small width from a band of large width, consisting of preparing a woven sheet having the form of a band and woven in such manner as to have a high longitudinal strength and a low transverse strength, coating one face of this sheet with a layer of plastic material, closing the pores of the sheet and also giving it dimensional stability, while the other face of the sheet is coated with an adhesive product, for example of the pressure-activated type, the sheet being then wound on a mandrel having a progressive axial movement so as to ensure the formation of a roll made-up of turns, the edges of which form truncated cones, one internal and re-entrant the other external and salient, then making a tear-starting cut at the free extremity of the band on the salient cone side, corresponding to the desired width of the tear-off strip, which is then removed from the band by the application of a tensile force on the strip in the longitudinal direction of the band.

---

The present invention relates to a method of and a device for the production of tapes or strips of small width from a band of large width.

It is known that certain packages, made for example of cardboard are provided, with the object of facilitating opening, with an internal strip of small width which, by means of a pull applied to an external pulling tongue, is intended to tear the carboard and, in consequence, to ensure the opening of the package, in particular by separating the latter into two parts.

Strips or narrow bands of this kind must therefore have a longitudinal tensile strength greater than the force which is necessary to tear the cardboard.

Strips or narrow bands are known at the present time which are made from strong threads arranged parallel to each other and joined together by sticking. Another known technique consists of sticking threads of this kind on an appropriate support.

The strips obtained are generally covered with an adhesive product which may be of the pressure-sensitive type. Due to their small width, the manufacture of such strips is long and meticulous, which results in a low output; in addition, the positioning and application of an adhesive offers considerable difficulties, which result in irregularities in the film deposited.

In order to remedy the above-mentioned drawbacks, it has already been proposed to produce a strip provided with reinforcement threads such as above, from which small strips of the desired width can be cut-off. This method however does not prove satisfactory because the cutting operations cannot be carried out on the usual cutting machines for adhesive tapes, without modification of this equipment. Furthermore, when the strip is obtained by cutting, the reinforcement threads on the edges of the strip are frequently damaged, which results in weak points on the edges of the strips, thus affecting the initial strength characteristics given to these strips.

In fact, these damaged portions are most frequently the beginnings of points of breaking caused by accidental cutting or by the separation of the threads close to the edges of the strip. Now, the strips are laid at very high speed on the starting sheets employed in the manufacture of the packages, and they are subjected to tensions which cause them to break if they have zones of reduced strength created during cutting. It will therefore be appreciated that under these conditions, the breaking of the strips can substantially interfere with the progress of the operations.

On the other hand, it is also known to divide bands of large width comprising parallel threads and an adhesive coating, into narrow strips by tearing, facilitated by an initial cut, this division being carried out over the whole width of the fabric. As in the previous case however, the cuts made are liable to give rise to the previously-mentioned drawbacks.

The present invention has for its object to eliminate the above-mentioned disadvantages and proposes for that purpose a method and a device capable of producing tear-off strips or narrow bands of the kind considered, with a high output.

The method according to the invention consists of producing a woven sheet in the form of a built-up band, so as to have a high longitudinal strength and a low transverse strength, and then to cover this sheet, on the one hand with a layer of plastic material which, at the same time as it closes the pores in the sheet, gives this latter dimensional stability, and on the other hand, to coat one face of the said sheet with an adhesive, for example of the pressure-sensitive kind, the band thus prepared being then wound on a support with preferably an axial displacement, so as to ensure the formation of a coil constituted by displaced turns defining the lateral edges in the form of a truncated cone, one re-entrant, the other projecting, following which, after an initial cut made on the side of the truncated cone which projects and which corresponds to the desired width of the strip, the latter is removed from the coil by tearing, by means of a simple pull applied in the longitudinal sense of the sheet.

By virtue of this method, there is obtained a tear-off strip which has on the one hand a continuous thread on each edge, thus preventing the starting points of breaks, and which on the other hand is provided with an adhesive coating which has no extra thickness in view of the facility of the application of this latter on the initial sheet.

According to one aspect of the invention, the warp of the sheet is made-up of fibres of the polynosic type and comprises 20 threads of 280 deniers to the centimetre, while the weft of the said sheet is made of artificial silk and comprises 11 threads of 90 deniers to the centimetre, this sheet being coated on one face with a film constituted by a mixture of cellulose acetate, vinyl chloride copolymer, vinylidene chloride and a plastifying agent, while on the other face it is coated with a pressure-sensitive adhesive constituted by worked rubber, terpinic resin and an anti-oxidizing agent.

The present invention also provides an apparatus for the production of tear-off strips of small width from a band of large width, carried out following the above method, this apparatus being especially characterized in that it comprises a mandrel for winding the band, capable of being driven in rotation, and with which is associated a cheek of generally frusto-conical shape, comprising a plurality of elements arranged so as to provide, according to requirements, for a modification of the angle of the truncated cone which they define, this assembly thus formed being intended for mounting rotatably on a mandrel carrier which is in turn capable of controlled axial movements, whereby the displacement of the mandrel carrier with respect to the band to be wound ensures the winding of the said band in laterally displaced turns of a definite pitch on the mandrel, while the said frusto-conical cheek is regulated in such manner as to support the corresponding re-entrant portion of the coil obtained.

With a device of this kind, it is possible to take-off from the coil thus formed a strip or narrow band, beginning from the side of the coil which is opposite the frusto-conical cheek. This strip is obtained by making at the free extremity of the band a tear-starting point defining a width corresponding to the desired width of the strip and then applying a tensile pull on this strip. The tear-off strip is then obtained by simple tearing action, which is very easily effected by reason of the structure given to the band, which gives it low transverse strength.

Other characteristic features and advantages of the invention will furthermore be brought out in the description which follows below, given solely by way of example, reference being made to the accompanying drawings, in which:

FIGS. 1 and 2 show in two positions the frusto-conical cheek element intended to be mounted on the mandrel;

Figure 1:
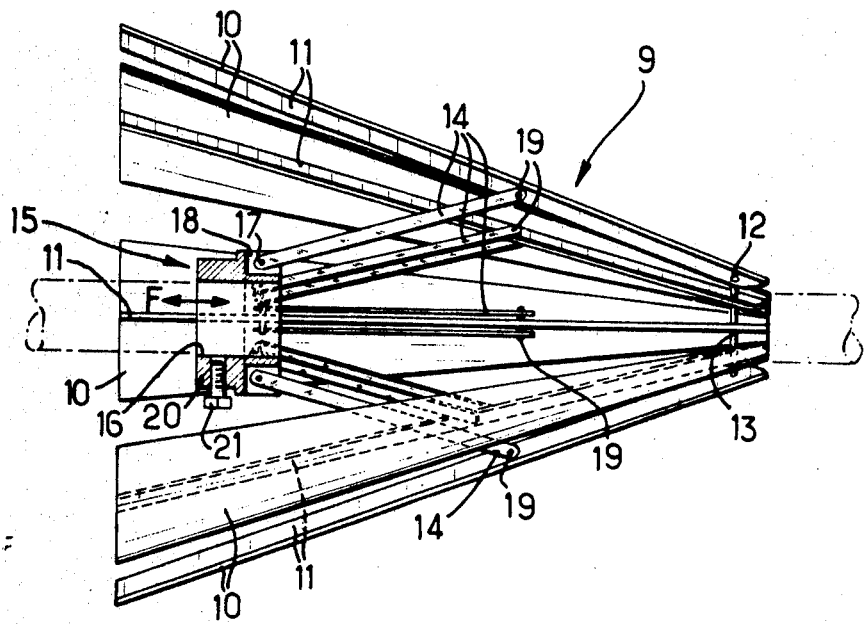

In the form of construction chosen and shown in FIGS. 1 and 2, the frusto-conical cheek element indicated generally at 9, is constituted by fins 10 of trapezoidal shape, eight in the example chosen, each provided on the inner side of the truncated cone with ribs 11.

On the side intended to form the small base of the truncated cone, the ribs of these fins are provided with bores 12, in which is engaged a hoop 13 ensuring on the one hand the coupling of the fins and, on the other hand, forming a pivotal axis for the said fins.

The fins are joined together internally by means of arms 14 to a ring 13 provided with an axial passage 16, the purpose of which will appear later.

The rods are articulated at 17 on the elements 18 of the ring 15, and at 19 in a central part of the ribs 11.

Beyond the elements 18, the ring 15 further comprises an additional thickness 20 intended to receive a locking-screw 21.

As is clearly shown in FIG. 2, the frusto-conical element thus produced can be regulated at will and can be given a more or less accentuated conicity by simple axial displacement of the ring (arrow F).

Figure 3:
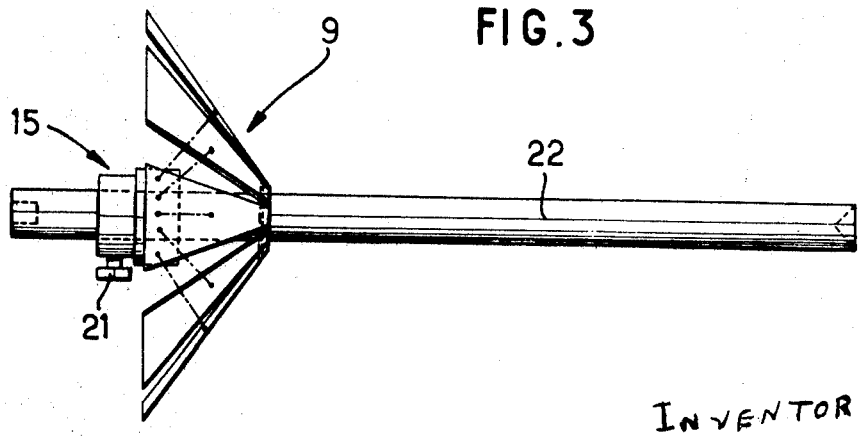
FIG. 3 shows digrammatically, to a smaller scale, the said element mounted on a mandrel.

Reference will now be made more particularly to FIG. 3, from which it is seen that the above-described element 9 is engaged and fixed by means of the locking-screw 21 on the winding cylindrical mandrel 22.

Figure 4:
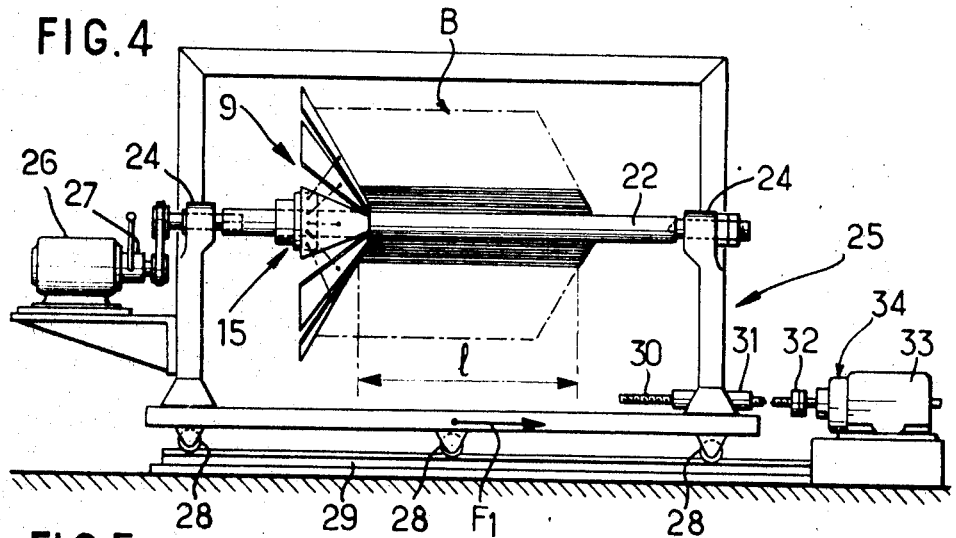
FIG. 4 illustrates in a diagrammatic manner the above assembly fitted on a mandrel-carrier frame.

The assembly thus formed can be fitted, as clearly shown in FIG. 4, on a mandrel carrier 24 rigidly fixed on a moving frame indicated as a whole by 25.

The mandrel carrying the frusto-conical cheek element 9 can either be driven in rotation in any appropriate manner, for example by means of an electric motor 26, or it may be disconnected from this motor, for example by means of a clutch 27, and rotate freely.

It should be noted that the adaptation of the mandrel on the mandrel carrier is effected in any appropriate manner, not described here because it is known per se.

The movable frame rests, through the intermediary of rollers or wheels 28, on rails 29, and it can be moved along these rails by means of a screw 30 engaged in a threaded socket 31 fixed to the frame. This screw is coupled at 32 to the output shaft of a motor 33 coupled to a speed-reduction gear and a speed-varying gear shown diagrammatically at 34.

It can immediately be seen that rotation of the screw in one direction or in the other causes a displacement of the frame parallel to the shaft of the mandrel 22.

With a device of this kind, the sheet of width $l$ produced following the method according to the invention, is suitably anchored at one extremity on the mandrel, having one edge located in the immediate vicinity of the small base of the frusto-conical cheek element 9, after which the winding of the band on the mandrel 22 can be proceeded with by setting the mandrel in rotation.

From the beginning of the winding operation, the frame 25 is slowly moved, by means of the screw 30, at an appropriate speed in the direction of the arrow F1. For this reason, the band is wound on the mandrel with a continuous and uniform axial displacement, forming turns staggered towards the truncated cone, which then supports the re-entrant portion of the roll B thus formed.

When the winding is completed, the frame is immobilized and the mandrel carrier is freed by de-clutching its driving means and can for this reason rotate freely.

Figure 5:
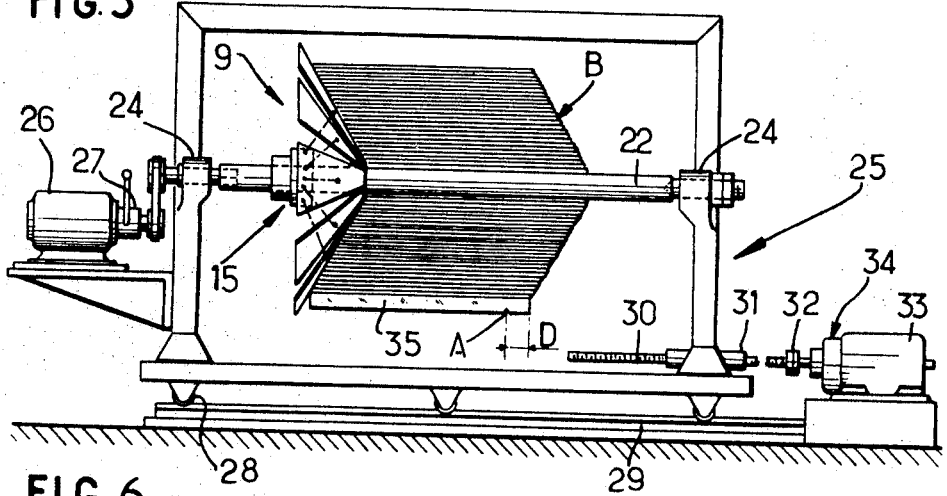
FIG. 5 illustrates a section of the winding of the band on the mandrel.

For the purpose of obtaining a strip, a small cut is effected, as shown at A in FIG. 5, by means of a pair of pincers (not shown) on the free extremity 35 of the band, beginning at the side opposite to the cheek element 9. This starting notch is effected at a certain distance D from the free edge of the band, this distance corresponding to the desired length of the tear-off strip.

The extremity of the strip thus freed is led-off and then placed on a reel (not shown) which can be driven in rotation, and on which the strip is wound. The tensile force applied by the reel which receives this strip causes the tearing of the band from the starting-notch, by virtue of the low transverse strength given to this band by its construction.

The strip thus obtained is advantageously wound in a crossed winding by means of a guide, following a known technique, and the tearing-off is continued over the entire length of the band up to the extremity which is in contact with the mandrel 22.

Figure 6:
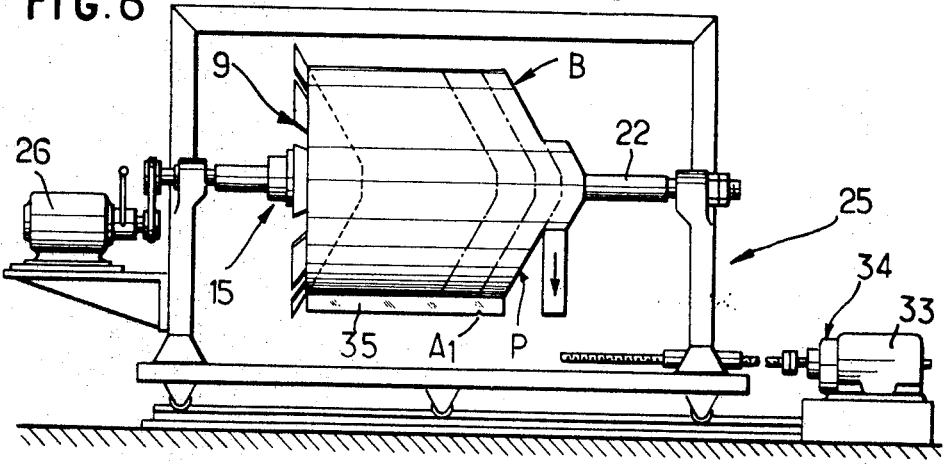
FIG. 6 shows the extraction of a strip from the coil or roll.

It should be observed that in addition to the low transverse strength given to the initial band, the winding in staggered turns of the band on the mandrel 22 facilitates the tearing-off, in particular due to the winding in staggered turns of the roll B, which permits immediate disengagement of the strip obtained with respect to the uncovered portion P (see FIG. 6). When a strip has been torn-off the band, a fresh starting notch A1 is effected at a certain distance from the new free edge, and so on.

This strip A1 and those following can be given the same width as the strip A, and the strips obtained can be joined together one after the other at will, so as to form a strip of great length, or they may be separately wound on reels.

By virtue of the frusto-conical cheek element 9, the angle of which can be modified according to requirements, it is possible to obtain, with a suitable speed of movement of the frame, rolled bands of which the turns are more or less staggered, especially as a function of the width of the strip to be obtained and of the nature of the initial band, the reels obtained then having lateral sides in the form of a truncated cone having a more or less accentuated angle.

The woven sheet may be composed of natural, artificial or synthetic fibres or of mixtures of these, and may be provided with any kind of reinforcement giving the band a high longitudinal strength and relatively-low transverse strength.

In addition, the film coated on the sheet and closing the pores may be constituted by plastified polyvinyl chloride, polyethylene, polypropylene, plastified polyester resin, or any other resin permitting the production of a flexible support.

With regard to the adhesive product which is coated on the other face of the band, it may be of the type sensitive to pressure or to heat or it may be an adhesive which can be activated by water or solvents.

It will of course be understood that the invention is not limited to the forms of construction described, but includes all their alternative forms.

What I claim is:

1. A method of preparation of strips of small width from a band of large width, comprising the steps of: coating one face of a woven sheet, having a high longitudinal strength and a low transverse strength, with a layer of plastic material which closes the pores of said sheet and also gives dimensional stability to said sheet; coating the other face of said sheet with an adhesive product; winding the sheet thus prepared on a cylindrical mandrel having a frusto-conical cheek while imparting to said mandrel a continuous axial displacement for causing the cheek to support the sheet along one edge thereof through the winding operation, thereby ensuring the formation of a roll made up of turns, the edges of which form truncated cones, one re-entrant, the other salient; making a tear-starting cut perpendicular to and at the free extremity of said band on the salient cone side, corresponding to the desired width of the tear-off strip; and tearing of said strip by applying a tensile force in the longitudinal direction of said band.

2. A method as claimed in claim 1, in which said adhesive product is of the type activated by heat.

3. A method as claimed in claim 1, in which said adhesive product is of the type activated by water.

4. A method as claimed in claim 1, in which said adhesive product is of the type activated by solvents.

5. A method as claimed in claim 1, in which said woven sheet consists of a warp constituted by threads of the polynosic fibers and a weft composed of artificial silk threads.

6. A method as claimed in claim 1, in which said woven sheet is coated on one face with a layer composed of cellulose acetate, copolymer of vinyl chloride and vinylidene chloride and a plastifying agent, the said layer closing the pores of said woven sheet.

References Cited

UNITED STATES PATENTS

| | | | |
|---|---|---|---|
| 1,162,384 | 11/1965 | Nichols | 156—193 |
| 1,211,514 | 1/1917 | Wilson | 156—189 X |
| 2,327,790 | 8/1943 | Hopkins | 156—187 X |
| 2,750,314 | 3/1949 | Bommels | 161—144 |
| 3,112,895 | 12/1963 | Kinney | 156—190 X |
| 3,272,672 | 9/1966 | Lampman et al. | 156—189 |

CARL D. QUARFORTH, Primary Examiner

G. SOLYST, Assistant Examiner

U.S. Cl. X.R.

161—91